(No Model.)
3 Sheets—Sheet 1.
A. L. DUWELIUS.
ELECTRO MAGNETIC BRAKE SYSTEM.
No. 296,319. Patented Apr. 8, 1884.
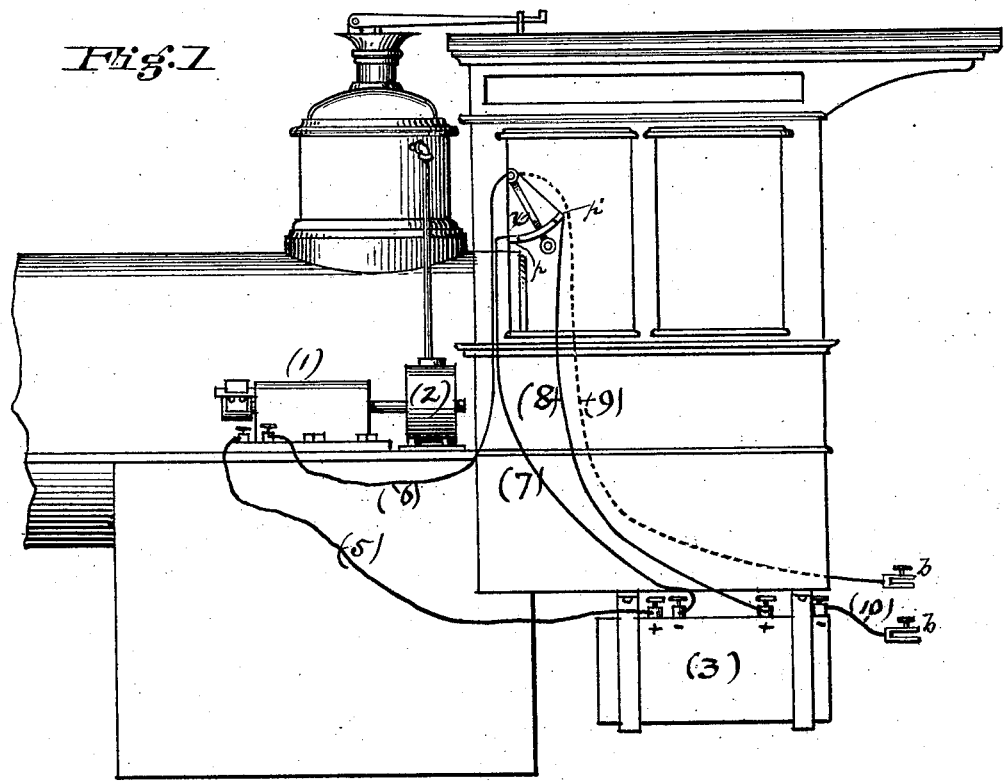

(No Model.) 3 Sheets—Sheet 2.
A. L. DUWELIUS.
ELECTRO MAGNETIC BRAKE SYSTEM.
No. 296,319. Patented Apr. 8, 1884.
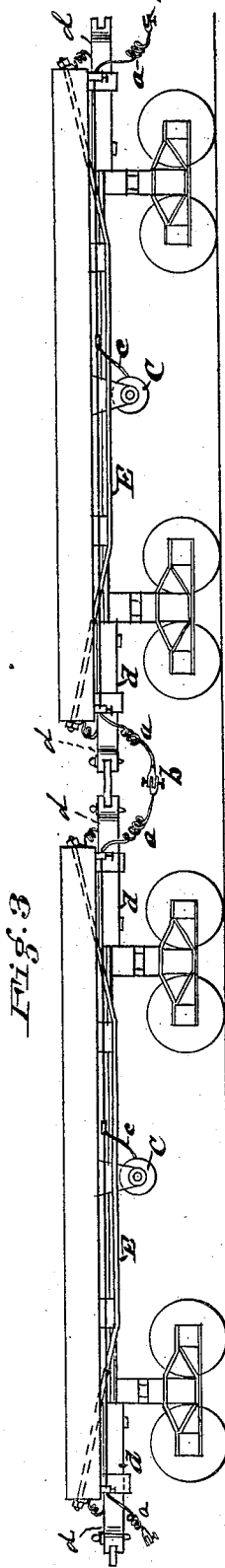
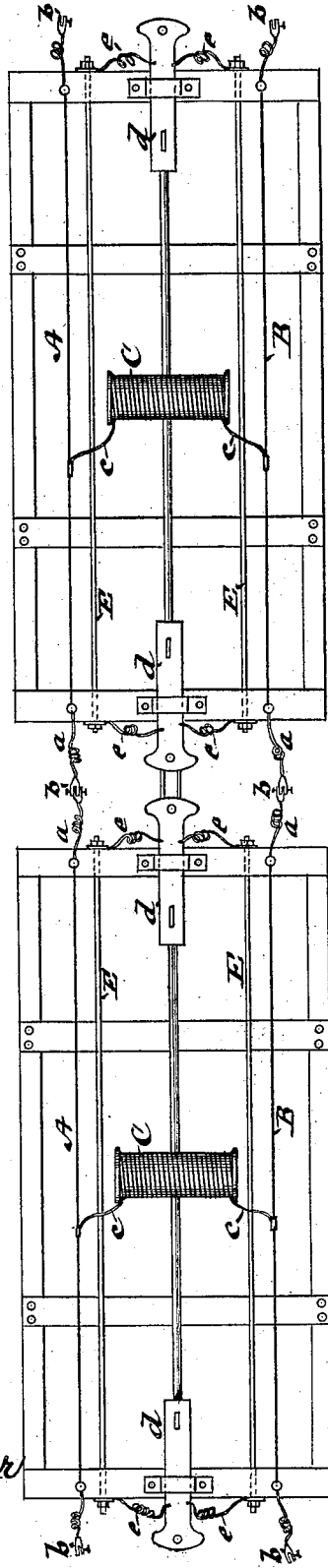
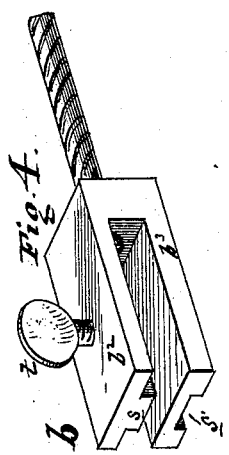

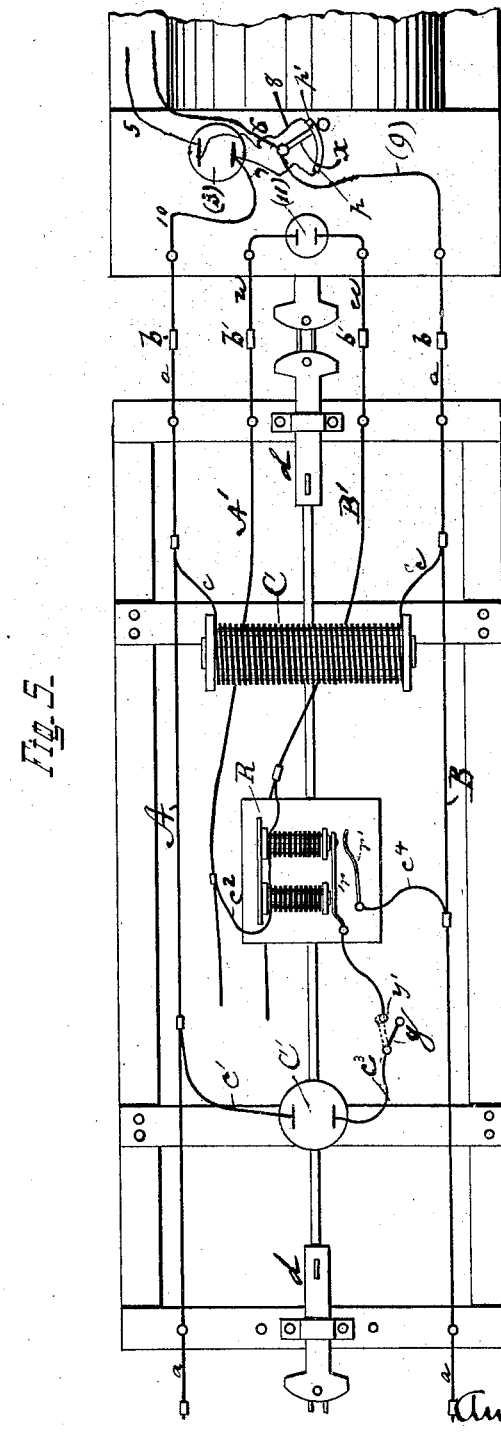

UNITED STATES PATENT OFFICE.

AUGUSTUS L. DUWELIUS, OF CINCINNATI, OHIO.

ELECTRO-MAGNETIC-BRAKE SYSTEM.

SPECIFICATION forming part of Letters Patent No. 296,319, dated April 8, 1884.

Application filed November 5, 1881. (No model.)

*To all whom it may concern:*

Be it known that I, AUGUSTUS L. DUWELIUS, a citizen of the United States, residing at Cincinnati, Hamilton county, Ohio, have invented new and useful Improvements in Electro-Magnetic-Brake Systems and Apparatus, of which the following is a specification.

My invention relates to the application of electro-magnetism for operating the brakes of railway-cars, its objects being to provide for automatically setting the brakes of a car or cars which may become accidentally detached from a train provided with electro-magnetic-brake apparatus according to my invention.

In electro-magnetic-brake systems heretofore used, so far as I am aware, the electro-magnets have been energized by electric currents applied by galvanic batteries or magneto-electric machines. The use of galvanic batteries for this purpose is attended by great difficulty and expense, as such galvanic batteries, to be strong enough, must be of cumbrous size, and, as is well known, consume a large quantity of chemicals and electro-positive metal, their currents lack uniformity in electro-motive force and rapidly become weaker as the batteries are used, and frequent inspection, replenishment of materials, and cleaning of the cells and electrodes are necessary to reach good results. Magneto or dynamo electric machines are a cheap and convenient means of producing powerful electric currents for brake systems, the main difficulty attending the use of such machines consisting in the delay in generating the current in sufficient volume to be effective at the precise time that it is needed, for, as is well known, such machines, when first started into operation, do not furnish their full current, and therefore a prompt application of the brakes in response to a warning has been impracticable when a magneto-electric machine alone has been relied on to furnish the current. In overcoming the disadvantages characteristic of electro-magnetic-brake systems as heretofore organized I use an accumulating or secondary battery to supply the currents directly to the brake-magnets, and this battery I maintain in efficient operative condition by means of a dynamo-electric machine, the current of which is used in the well-known manner for charging such secondary battery during the intervals between the uses of the brakes. The dynamo-electric machine and secondary battery I preferably locate upon the locomotive used to haul the train, and connections from the said battery to the brake-magnets of the cars may be made in any convenient manner—such, for instance, as hereinafter particularly described, and illustrated in the accompanying drawings. To operate the dynamo, I use, preferably, a small rotary steam-engine supplied with steam from the locomotive-boiler, and having its main shaft coupled with the armature-shaft of the dynamo. It will now be seen that in my system I utilize the cheapest and most reliable known means for mechanically generating the primary electric energy which is required, and by storing this energy when it is not required for use I maintain it in a potent condition, which renders it available instantaneously when it is required for setting the brakes. This instantaneous availability of a powerful current is absolutely essential to an efficient magneto-electric-brake system, for if the current is not promptly on the conductors after a signal for brakes is given the time will pass when the greatest advantage would be gained, and instead great damage may result. In this respect the exigencies of an electric-brake system are more imperative in their requirements than those of any other electric installations. This mode of using my invention, including the auxiliary apparatus for applying the brakes automatically to cars which have been accidentally detached from the train, will be clearly understood from the following particular description, in connection with the accompanying drawings, in which—

Figure 1 is a partial side elevation of a locomotive-engine provided with a dynamo-electric machine, a motor for driving the same, an accumulating-battery, and suitable electric connections for applying electric energy to car-brakes according to my invention. Fig. 2 is a plan diagram illustrating two connected cars of a train provided with electro-magnetic-brake apparatus according to my invention. Fig. 3 is a side elevation of two cars, as illustrated in Fig. 2. Fig. 4 is a detached perspective view of a coupling for connecting the conductors between cars. Fig. 5 is a plan diagram including a portion of a locomotive and a connected car, and illustrating my auxiliary automatic safety-brake apparatus.

Referring to Fig. 1, the numeral 1 designates a dynamo-electric machine which is arranged on the running-board of the locomotive, and the numeral 2 indicates a rotary steam-engine, also located on the running-board and having its shaft prolonged and coupled with that of the dynamo, this engine being supplied with steam from the locomotive-boiler through a pipe which is shown connected with the steam-dome.

The numeral 3 designates an accumulating or secondary battery, which by means of suitable hangers is suspended below the foot-board of the locomotive-cab. One of the terminals of the dynamo-electric machine is connected with one of the electrodes of the secondary battery by means of a wire, 5, and the other terminal of said machine is connected by a wire, 6, with a switch-lever, $x$, located on the cab within convenient reach of the engineer. This switch-lever is arranged for alternate contact with two contact-plates, $p$ and $p'$, which are respectively connected with the opposite electrodes of the secondary battery by means of wires 7 and 8, the wire 7 being connected to the electrode opposite that which is connected with the dynamo by wire 5, and to the same electrode from which leads a wire, 10, provided with a coupling, $b$, for connecting said wire with a corresponding coupling on a conductor, (not shown,) which leads off to the cars of the train. A similar coupling is also attached to a wire, 9, (shown in dotted lines,) leading from the switch-lever $x$. It will now be seen that if the switch-lever $x$ is brought in contact with the plate $p$ the opposite terminals of the dynamo-electric machine will be respectively connected to opposite terminals of the secondary battery 3, and when the rotary engine 2 is put in operation and the dynamo driven thereby the current generated by the dynamo will pass through the secondary battery and charge the same in the usual manner. I have not shown any devices for indicating when the secondary battery is fully charged, as such devices and the mode of applying the same are well known. It will also be seen that if the switch-lever $x$ is removed from the plate $p$ the charging-circuit of the dynamo will be broken; and, if said switch-lever is brought into contact with the plate $p'$ wires 8 and 9 are electrically connected; and if the two couplings $b$ $b$ are connected to the opposite terminals of an electric circuit the current of the secondary battery will be discharged over such circuit.

In the diagram, Fig. 2, I have illustrated a magneto-electric car-brake circuit adapted for connection with the secondary battery by means of these couplings. The cars Z Z are coupled in the usual manner by draw-heads $d$, and each car is provided with two main conductors, A and B, formed of insulated wire, and having their ends $a$, which extend outward a suitable distance beyond the ends of the cars, provided with coupling devices $b$, similar to those attached to the wires 9 and 10, and which can be used for connecting the conductors in two lines from car to car, as well as to the conductors leading from the locomotive. Upon each car is arranged an electro-magnetic-brake mechanism which, in the present instance is represented conventionally by a simple helix, C, and may be constructed according to any of the well-known types, but preferably as described and illustrated in the Letters Patent No. 242,615, granted to me and my assignees on the 7th day of June, 1881. The helix C, which may be regarded as the helix of the electro-magnet in my said patented brake, is connected with the conductors A and B, so that when the conductors of a number of cars composing a train are connected in two lines leading from the secondary battery the brake mechanisms of the several cars are connected up in circuit with said battery on what is known as the "multiple-arc" system.

By persons familiar with electrical apparatus it will be readily seen that when the conductors A B are coupled with the wires 9 and 10 of Fig. 1, and the switch-lever $x$ is put in contact with plate $p'$, the electrical energy, which has been previously stored in the secondary battery 3, will be discharged over the multiple-arc circuit thus completed and including the electro-magnetic-brake mechanisms of the cars, so that the brakes will be operated by electro-magnets energized by very powerful electrical currents. It will also be readily understood that the full charge of the secondary battery is not expended in a single setting of the brakes, and as soon as the brakes are taken off or relaxed the dynamo-electrical machine may be again connected with the accumulator, and in a short time re-establish the maximum energy of its charge, so that the intervals between the uses of the brakes will furnish ample time for maintaining the accumulator in such condition that its highest potential is at immediate command when required. The accumulating-battery is of high utility in many electric systems, but in no other than a brake system, that I am aware of, is its vigorous current called for on rapidly-intermittent occasions, the intervals of which afford opportunity for its rapid and complete restoration after each use.

The conductors may be connected between the cars by any suitable means; but I prefer to use the form of coupling shown in Fig. 4, in which the metal socket-piece $b$ has two jaws, $b^2$ $b^3$, the former of which has a longitudinal rib, $s$, on its inner surface, while the latter has a longitudinal groove $s'$, in its outer surface, both jaws being preferably slightly elastic, and so proportioned that in using two such couplings to connect two conductors the grooved jaws of each can be placed snugly in between the two jaws of the other and receive in its groove the rib of the ribbed jaw. The resilience of the jaws holds the couplings against being pulled apart longitudinally, and the grooves and ribs prevent them from working apart by lateral vibration.

Set-screws $t$ may be used for clamping the parts together when they become loose-fitting by wear; but I prefer to keep the couplings in condition to hold together under ordinary strains simply by their elasticity, so that when subjected to any unusual pull—such, for instance, as would occur when a car is accidentally detached from a train—the two socket-pieces will separate without injury to themselves or breakage of the conductors.

In order to provide against the rendering of the system inoperative by the accidental breakage of any of the main conductors A B of the cars, I generally provide the metallic brace-rods E of the car-frame with terminal wires $e$, which, when not required for use, may for convenience be also connected to the draw-heads. Should one or more of the main conductors be broken, the brace-rods may be used temporarily in their stead by detaching the terminal wires $e$ from the draw-heads and attaching couplings to said wires, which may then be coupled to the conductors of an adjacent car. The helix C should of course in such case be connected to the brace rod or rods thus utilized for conducting the current.

In the diagram, Fig. 5, I have illustrated the auxiliary electro-magnetic devices by which the brakes are automatically applied on a car or cars which may become accidentally detached from the train. In this diagram the numeral 3 indicates the secondary battery, located upon the locomotive Z'. The dynamo-electric machine and motor are not shown, but the numerals 5 and 6 indicate the wires which lead from the dynamo to the secondary battery and switch-lever, respectively, as in Fig. 1. The other devices and connections of the main-brake apparatus are lettered and numbered the same as in Figs. 1 and 2. There is also located upon the locomotive an auxiliary source of electricity, preferably a secondary battery, (indicated by the numeral 11,) from the opposite poles of which lead wires $w$ $w$, connected by couplings $b'$ with auxiliary conductors A' B', arranged upon the car Z, and which may extend the whole length of the car and project beyond both ends thereof, the same as the conductors A B, though shown in drawings as projecting and coupled only at the end next to the locomotive. Upon the cars is located an electro-magnet having its terminal wires $c^2$ $c^2$ connected with the conductors A' B', respectively. The office of this magnet is to normally attract an armature, $r$, out of contact with a spring, $r'$, and thus keep broken a cross-connection between the main conductors A B, which includes a second auxiliary secondary battery, C', located upon the car. From one pole of this battery a wire, $c'$, leads to the main conductor A, and from the other pole a wire, $c^3$, connects with a switch-lever, $y$, which is arranged to make contact with a switch-point, $y'$, electrically connected with the armature $r$. The spring $r'$ is connected with the main conductor B by a wire, $c^4$; and it will be readily seen that when the armature $r$ is retracted into contact with said spring and the switch-lever $y$ is closed upon the point $y'$ the secondary battery C' will be connected with the main conductors A B on the multiple-arc plan. The secondary batteries 11 and C' are intended to be placed upon the train in an already-charged condition, as is a common practice in the use of such batteries. I may, however, use any other suitable source of electricity, in lieu of the secondary battery 11, on the locomotive—as, for instance, a galvanic battery of the type known as "constant" batteries.

The operation of the automatic auxiliary brake apparatus will be readily understood. The current from the battery 11, passing over the conductors A' B' and the coils of electro-magnet R, vitalizes said magnet and causes it to attract the armature $r$ out of contact with the spring $r'$, and therefore the discharging-circuit of the secondary battery C' is normally broken; but should the car Z become accidentally detached from the locomotive, the conductors A' B', as well as the conductors A B, would be detached from their battery-connection, and while the main helix C would thus be prevented from receiving an energizing current from the main secondary battery 3, it would be immediately thrown into circuit with the auxiliary secondary battery C', because the magnet R, being cut off from its energizing-battery 11, will release its armature $r$, which will then be retracted into contact with the spring $r'$, and thus close the arc or cross-connection, which brings the auxiliary secondary battery C' in circuit with both the main conductors A B and the helix C, so that the core of said helix will be magnetized and operate the brakes. It will be readily understood that the same operation would occur upon any number of cars thus accidentally detached, if the auxiliary conductors A' B' were extended rearward through an entire train and connected on each car with devices such as illustrated in the present diagram.

The switch $y$ may be opened to prevent the brakes from being operated when cars are purposely detached and desired to be moved upon sidings or back and forth, as in the process of making up trains, or for other purposes. In freight service a single auxiliary secondary battery may be located upon the caboose for placing a current on the main conductors to operate the brakes automatically in case of accidental detachment of cars; but I prefer to provide each car with an auxiliary accumulator, as shown at C'.

Having now fully described my invention and explained the operation thereof, I claim—

1. The combination, with the main source of electricity and the main system of apparatus for the direct application of electro-magnetism to railway-brakes, of an auxiliary source of electricity, and devices for automatically connecting the same with the conductors of the main system when said conductors become disconnected from the main source of electricity, substantially as described.

2. The combination, with the main conductors A B, electro-magnetic-brake mechanism C, and a main source of electricity and connections for supplying a current over said main conductors, of the auxiliary conductors A' B', auxiliary generator 11. magnet R, the auxiliary secondary battery C', the electrical connections, and circuit breaking and closing devices, substantially as and for the purpose set forth.

In testimony whereof I have hereunto set my hand in the presence of two subscribing witnesses.

AUGUSTUS L. DUWELIUS.

Witnesses:
L. M. HOSEA,
W. G. RAINEY.